United States Patent [19]

Brinkmann et al.

[11] 4,007,315
[45] Feb. 8, 1977

[54] BATTERY CELL COOLING SYSTEM

[75] Inventors: Jürgen Brinkmann, Hagen;
Hermann Franke, Ennepetal, both of
Germany

[73] Assignee: Varta Batterie Aktiengesellschaft,
Hannover, Germany

[22] Filed: Mar. 12, 1975

[21] Appl. No.: 557,831

[30] Foreign Application Priority Data

Mar. 27, 1974 Germany .......................... 2414758

[52] U.S. Cl. .................................. 429/62; 429/120
[51] Int. Cl.² ........................................ H01M 10/50
[58] Field of Search ............. 136/161, 180; 429/62, 429/120

[56] References Cited
UNITED STATES PATENTS

| 746,289 | 12/1903 | Chamberlain | 136/161 |
|---|---|---|---|
| 1,587,425 | 6/1926 | Schepp | 136/161 |
| 2,282,923 | 5/1942 | Ambruster | 136/161 |
| 2,405,144 | 8/1946 | Holthouse | 136/161 |
| 2,410,952 | 11/1946 | Lighton | 136/161 |
| 3,309,234 | 3/1967 | Rundles | 136/161 |

*Primary Examiner*—Donald L. Walton
*Attorney, Agent, or Firm*—Weiser, Stapler & Spivak

[57] ABSTRACT

Multi-cell battery cooling is accomplished by cooling elements immersed in the cell-top electrolyte. The elements have high heat conductivity and electric resistance. The cooling medium has low electric resistance. Various configurations of circulatory flow paths provide various utilizations for the medium beyond that of cooling the cells.

17 Claims, 12 Drawing Figures

BATTERY CELL COOLING SYSTEM

The invention relates to a method for dissipating the heat developed in the individual cells of storage batteries, and particularly in vehicle propulsion batteries. This dissipation is accomplished by means of cooling elements arranged above the plates, within the electrolyte, and by additional apparatus which makes it possible to put to constructive use the heat being dissipated.

In the operation of propulsion batteries, especially those for electric road vehicles, there are encountered, both during driving and during charging, current flows which are high relative to the rated capacity of the batteries. Starting currents amounting to 1 to 2 times the rated value are not unusual in modern, electrically driven road vehicles. Account must also be taken of the fact that the application of semiconductor control techniques causes the current demands imposed on the batteries to commonly be in pulse form.

In currents of pulse form, the effective value of the current exceeds the arithmetic average. In contrast, in true direct current, the two values would be the same. It is known that the arithimetic average intensity of a current is a measure of the turning moment produced in a DC motor as well as of the amount of current drawn from a battery. In contrast, the effective value is the determining factor for the major part of the losses in the conductors, the motor and the battery. Due to the square-law relationship between current heat losses and the effective value of the current ($I^2R_i$), the losses during current drain from the battery increase more than proportionately when a current of pulse form is drawn from the battery, rather than a true direct current. Thus, the high current flows imposed upon such vehicle propulsion batteries, as well as the pulse form of these current flows leads to increased losses in the battery. During continuous use, this leads to excessive heating of the batteries and that in turn causes at least an appreciable unwanted reduction of their output and ultimately damage to the cells.

Propulsion batteries for electric vehicles, and particularly for electric road vehicles, are large both in volume and weight. Moreover, they are of very compact construction. Consequently, the natural heat dissipation through the surface of the battery housing is not adequate to establish equilibrium between the heat produced by losses and the heat dissipated by surface cooling for a given permissible maximum temperature inside the body. This is especially true for completely "encapsulated" batteries.

A further disadvantage is that, in extended use of a battery assembly, a substantial temperature difference arises between the inner and outer cells.

Several methods are known for producing forced cooling of batteries. However, it has not been possible to completely overcome the above-noted disadvantages.

The heat losses occurring in storage battery cells arise in the interior of the cells, in the portions traversed by the charging or discharging current, primarily as conduction-loss heat. Only in certain ranges of the charging process is there also produced appreciable reaction heat. Due to the current distribution inside the cell, a predetermined distribution of the losses also takes place. This leads to such a temperature distribution that the upper portion of the cell becomes very warm, while the lower portion remains relatively cool. This temperature distribution is further intensified because warm electrolyte rises within the cell. Consequently, the electrolyte above the plate stack of the cell is at a high temperature and, because of its high specific heat, it stores there a large fraction of the heat produced in the cell.

Heat dissipation from a storage battery cell is especially intensive when it is possible to extract this heat directly, from the storage battery cells, by cooling of the electrolyte. The best cooling effect is achieved when this heat can be extracted from the upper portion of the cell electrolyte.

For that reason, it has previously been proposed to suspend cooling coils in the acid above the plates. These cooling coils are made of metal, which is a good heat conductor and they are connected among themselves through nonconductive tubing.

However, such an arrangement has a whole series of disadvantages. Specifically, metals must be used which are capable of resisting attack by the electrolyte which, in the case of a lead battery, is sulfuric acid. It is well known that such metals are costly and heavy. The arrangement of such metal cooling coils inside the cells must be accomplished with electrical insulation, so that there is reliable protection from electrode short-circuits under all operating conditions which, for vehicle propulsion batteries, include strong vibration.

Ordinarily, the individual cells are connected electrically in series, in order to produce a high overall potential within the battery. As a result, the metal cooling coils of the electrically series-connected cells are also subjected to a voltage which increases with increasing cell number, whether these are connected in series or in parallel. In turn, this results in short-circuit currents in the circulatory cooling system. This disadvantage can be obviated by interconnecting the cooling coils by means of non-conductive pipes or hoses. However, if the cooling liquid is a medium having relatively low specific electric resistance, then leakage currents still flow within this medium due to the applied potential. It is therefore necessary to utilize cooling liquids with very high specific electric resistance, such as distilled water. Moreover, appropriate means must be provided to continuously control the electric resistance of this cooling medium.

In series, or even in parallel connections of the cooling coils of the individual cells, and assuming use of the usual cooling media with relatively low specific electric resistance, the other metallic components in the circulatory cooling system, such as pumps, valves, and heat exchangers, are raised to some indeterminate electrical potential. To prevent accidents, additional means, such as contact protection, must be provided.

Disadvantages such as described above also apply to an arrangement such as disclosed in British Pat. No 776,240, in which cooling is accomplished by metal cooling coils in heat conductive contact with the cell connectors.

Accordingly it is a primary object of the invention to provide a method of dissipating the heat developed in the cells of a battery, and particularly a vehicle propulsion battery, utilizing cooling elements immersed in the electrolyte above the plates, in which the above-described disadvantages are eliminated, and in which there may be used as the cooling medium liquids which normally exhibit only low electric resistance.

It is another object to provide apparatus for practicing the above method which further makes it possible to utilize the heat losses of the battery for the heating of enclosed spaces, or vehicle interiors.

These and other objects which will appear are accomplished in accordance with the invention by pumping the cooling medium through the cooling elements in potential-free manner.

Preferably, the cooling medium is ordinary water, which has not even been demineralized, Of course, other cooling media may be used, whose specific electric conductivity is about the same or even greater than that of water.

For further details, reference is made to the discussion which follows in the light of the accompanying drawings wherein.

The same reference numerals are used throughout to designate similar elements.

Figure 1:
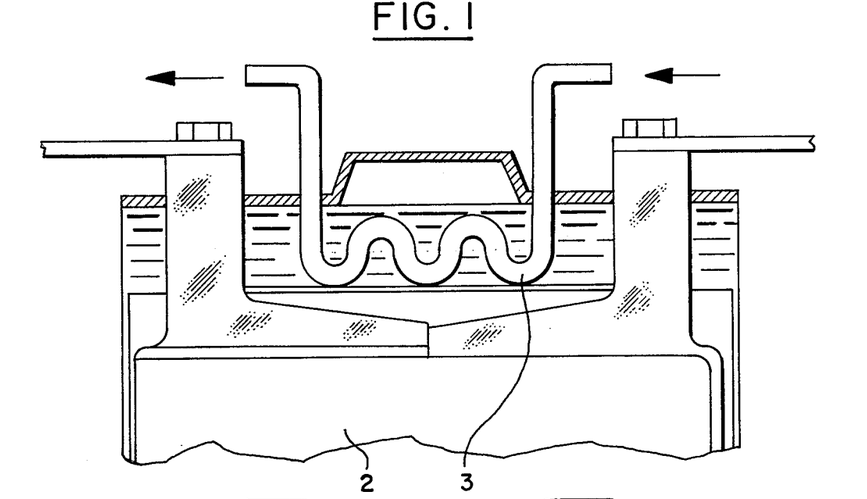
FIGS. 1 and 2 schematically illustrate two embodiments of a battery cell provided with cooling arrangements according to the invention.
Figure 2:
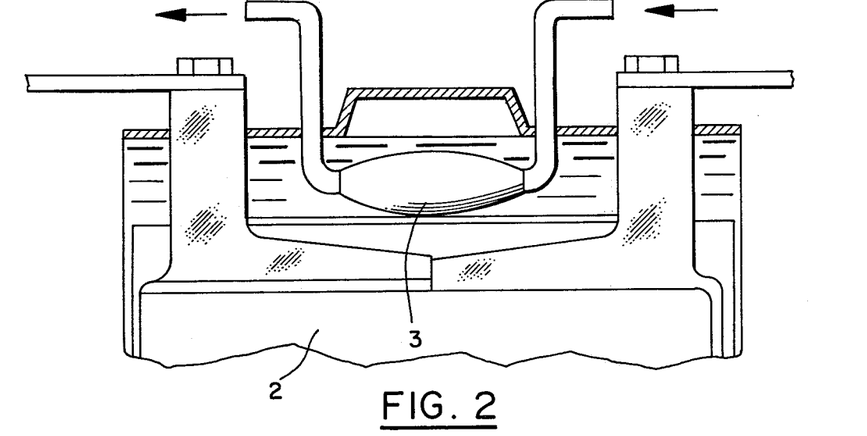

As shown in both FIGS. 1 an 2, the cooling elements 3 are so arranged in the individual storage battery cells 2 that they are permanently submerged in the electrolyte. By known means this can be assured under all operating conditions.

As shown in FIG. 1 these cooling elements 3 are made of cooling coils fabricated from pipes made of materials having suitably high heat conductivity and specific electric resistivity. As shown in FIG. 2, flat, large-surface cooling bladders 3 can also be used as the cooling elements. Appropriate materials for these cooling coils or cooling elements are polypropylene, polyethylene and PVC. Glass may also be used.

Figure 3:
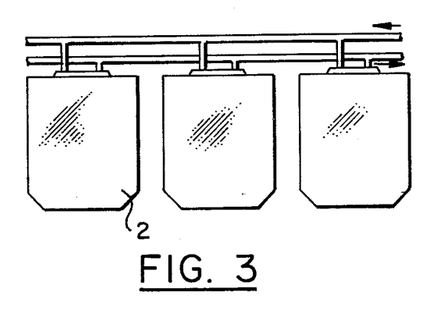
FIGS. 3 and 4 show, in schematic diagram form, two embodiments of the cooling arrangement for a multiplicity of battery cells.
Figure 4:
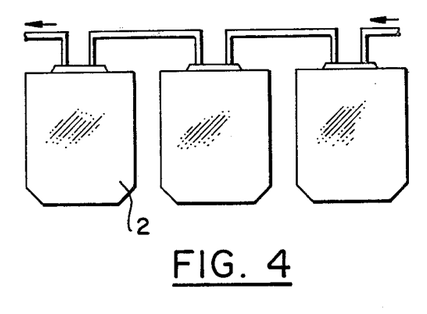
Figure 5:
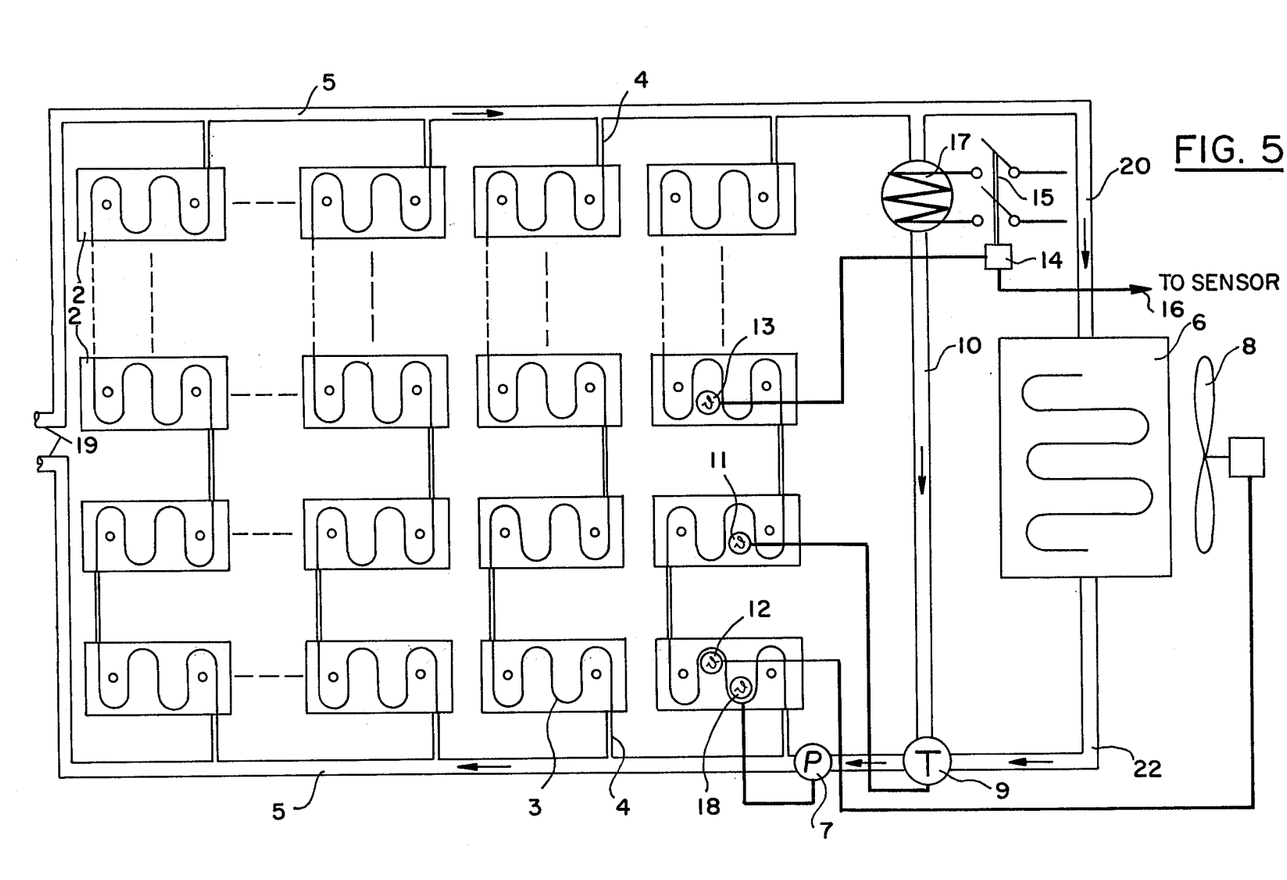
FIGS. 5 and 6 shows in more detail such cooling arrangements for complete storage battery assemblies.

The individual cooling elements 3 within cells 2 may be connected in series, as shown in FIG. 4, or in parallel as shown in FIG. 3. Combinations of these connections may also be utilized. A series-parallel connection of a cooling system embodying the invention is shown in FIG. 5. In this FIG. 5 embodiment a predetermined number of individual cell cooling coils 3 are connected in series. The inlets and outlets 4 of such cell series terminate at manifolds 5, to which is connected a heat exchanger 6 with inlet 20 and outlet 22. A circulating pump 7 causes a sufficient quantity of cooling liquid to flow continuously through the entire closed cooling system. The cooler or heat exchanger 6 can be forced-air cooled in conventional manner by a blower 8.

Figure 6:
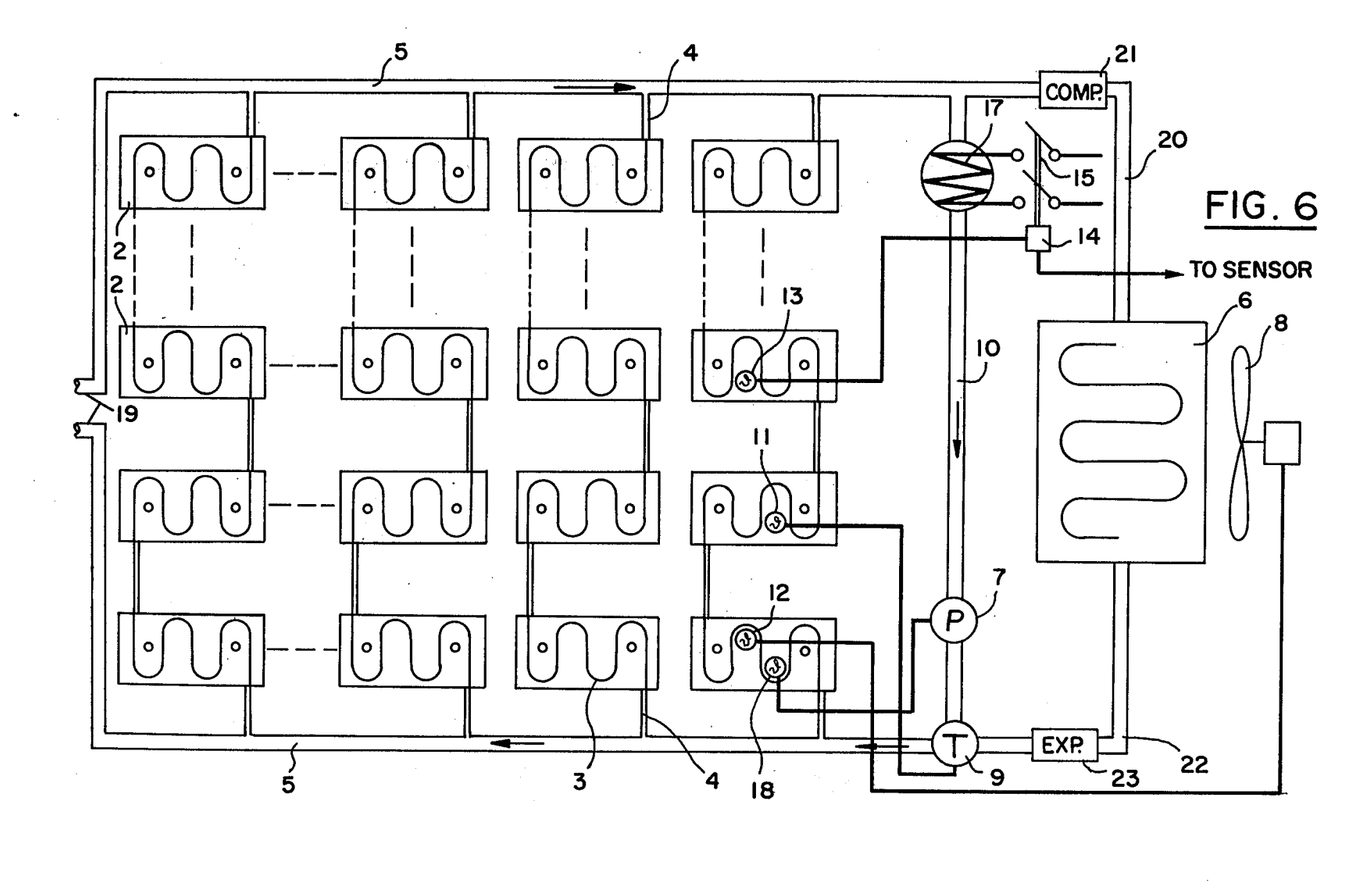

The broken line connections appearing in both FIGS. 5 and 6 between rows and columns of cells 2 indicate the possible presence in the battery as a whole of rows and columns of such cells in addition to the ones specifically diagrammed. For example, in a typical vehicle propulsion battery, there might be 180 such cells.

Reverting to FIG. 5, elements 11, 12, 13 and 18 are temperature sensors, by means of which the circulatory cooling system is controlled. A switching valve 9 permits the cooling medium to flow either through cooler 6 or through bypass conduit 10. Elements 14, 15 and 17 are the components of a heater system, by means of which the cooling medium may be warmed.

The driving motors for pump 7 and blower 8, and also the heating element 17 are supplied with the potential of the battery via switches (not shown). Likewise, the operating voltage for temperature sensors 11, 12, 13 and 18, and for the operating control elements of the cooling circulatory system is derived from the battery.

Pump 7, cooler 6, blower 8, valve 9, bypass conduit 10 and the components 14, 15 and 17 of the heating system are preferably assembled in a compact unit which can be mounted on the battery in various positions. Manifolds 5 then flexibly interconnect cells 2 with that unit.

In accordance with the invention, the cooling coils or cooling bladder 3 inside the cells are made of plastic— preferably polyethylene because of its relatively good heat conductivity accompanied by relatively high specific resistance. Therefore, the necessary electrical potential separation between cooling medium and cooled cell electrolyte is automatically obtained, inasmuch as the plastic serves as electrical insulator between the cell electrolyte and the cooling medium. At the same time, there is good heat transfer through the walls of the cooling elements.

Preferably, ordinary water can be used as the cooling medium. No substantial leakage currents arise, because there is no difference in electrical potential between the cooling medium of the individual cooling coils in the cells of the battery assembly and the circulatory cooling system. Special precautions for insulating the cooling coils inside the cells to prevent electrode short circuiting are therefore unnecessary.

It is also not necesary to insulate the entire coolant circulatory system, and this applies particularly to the heat exchanger, the pump and other auxiliary apparatus, such as the battery tray. Also, no protective means are needed to prevent accidental touching of the overall circulatory cooling system elements (contact protection).

It is known that the cells positioned in the interior of a cell assembly are substantially warmer than those on the periphery. In the natural cooling of a battery, the heat dissipation conditions for the outer cells are considerably more favorable because of the large heat exchange surface. In contrast, the cells positioned in the center of the battery can dissipate their heat only through a small free surface, namely through the adjoining cells and via the outer cells to the ambient. During continuous use of large batteries, temperature differences of more than 5° C and up to 20° C and even more are commonly encountered between the inner and outer cells. It is well known that such temperature gradients are very deleterious for batteries.

The heat extraction by cooling coils according to the invention is so intensive that, even for small volumes of cooling medium flow through cooling coils 3, the required dissipation from a given cell is achieved, even when the temperature difference between inlet and outlet temperature of the cooling medium in the cooling coil of a cell is considerably less than one degree.

Equalization of the temperatures in all cells is promoted by placing the inlets and outlets of the cooling medium from each cell to manifold 5 in the manner shown in FIG. 3, namely spatially opposed to each other. This provides uniform resistance to flow for all cooling medium paths. As a result, equal quantities of cooling medium flow through the different, parallel-connected cooling paths.

In a series connection of a large number of cooling coils 3 there is therefore produced, between the inlet temperature of the cooling medium into the first cooling coil and the outlet temperature from the last cooling coil, a temperature difference of only a few ° C. Consequently, the cell temperatures of the battery become equalized and there can arise between inner and outer cells only temperature differences considerably lower than those which arise when natural heat dissipation from the battery is relied upon.

It is desirable to so choose the flow direction of the cooling medium through the series connection of cooling coils that the cooling medium traverses first the cooling coils in those cells which are positioned in the center of the battery. The exit of the cooling medium from the series connection of cooling coils takes place from the coils of those cells which are located on the periphery of the battery. In this way, the natural heat dissipation from the outer cells further contributes to substantially eliminating those inherently small temperature differences between inner and outer cells which are attributable to the forced cooling.

The uniform temperature level thus achieved within all cells leads to consistently good operating characteristics and consistently long operating life for all the cells of the battery.

It is known that a storage battery has optimum properties only within a relatively narrow temperature range. Therefore, at low cell temperatures, cooling is not required. In fact, at even lower temperatures it may, under some circumstances, even be undesirable. Independently of the existing temperature level, however, it is very desirable that the temperature of all cells of a battery be, as above described, maintained at a uniform level.

To that end, there is provided the two-way valve 9 which is controlled in response to temperature in such a manner that, at low temperatures, the cooling medium does not flow through cooler 6 but through bypass conduit 10, so that it is not further cooled. When operated in this bypass mode, the cooling coils cooperate to rapidly produce the desired uniformity of all cell temperatures and to maintain this uniformity.

During start-up of batteries from a very low temperature condition, the internal losses of the battery are often not sufficient to bring the cells quickly to their optimum operating temperature. Heating element 17 in bypass conduit 10 makes it possible to heat the cooling medium. In such operation of the cooling system via bypass 10, the appropriate elevated temperature of all cells can be reached. The energy for heating the cooling medium by means of heating element 17 is preferably taken from a stationary power source, in order to avoid drain on the stored energy of the battery. To that end, the heating element 17 is connected via switch 15 to the electrical power supply (not shown) for the battery. A sensor 16 (also not shown) permits closing of switch 15 only when energy supply to heating element 17 can be made from a stationary power source. This would be the case, for example, during charging of the battery. In principle, however, heating may also be accomplished using the stored energy of the battery, and doing so is advantageous even under those conditions.

Heating element 17 may be a conventional electrical heating coil surrounding bypass conduit 10.

One or more temperature sensors 11 through 13 inside the battery cells switch blower 8, as well as two-way valve 9 and heating element 17 at the appropriate predetermined temperatures.

On the other hand, the system can be simplified through omission of bypass conduit 10, even during start-up, when conditions are such that the ambient air has little effect and the main purpose of the system is to equalize internal temperature. While this simplifies the system, it entails a concomitant increase in its thermal lag, due to the thermal inertia of the cooler 6 through which the cooling medium must then circulate.

Referring to FIG. 5, the operation of the battery cooling system will be described, based on the assumption that the battery initially starts from a low temperature level.

At battery start-up, pump 7 is first set into operation by means of a main switch (not shown) and the cooling medium is caused to circulate through the circulatory cooling system. This main switch may be operated by hand or controlled automatically, if desired, in response to activation of the main switch of the vehicle in which the battery is located. Because of the low temperature level in the cells, the temperature sensor 11 causes valve 9 to switch into that position in which the cooling medium flows through bypass conduit 10. This mode of operation initially equalizes the temperature in the cells.

If the temperature in the cells at start-up is below a predetermined value, then a pulse is supplied from temperature sensor 13 to operating element 14 of switch 15. This pulse switches on heating element 17, provided sensor 16 (not shown in this drawing) permits this. This takes place when the energy supplied for the heating element 17 is provided by an external power source. The simplest way is to have the sensor 16 measure the potential of the battery, since this is known to be considerably higher during charging than when the battery is disconnected or is discharging. Alternatively, sensor 16 can be a mechanically actuated element which responds to physical placement of the battery into connection with a charging element in a charging station. Upon activation of operating element 14 by sensor 16 due to the measured higher potential, the heating element 17 is supplied with energy from the charging circuit (not shown). Operating element 14 may be the coil of a solenoid which is energized by the pulse from sensor 13 to attract the armature of solenoid operated switch 15.

When a predetermined temperature is reached in the cells (namely the lower limit of their optimum operating temperature range) due to heating by heating element 17 or due to the losses occurring in the battery during charging or discharging, then the heating element 17 is first disconnected by temperature sensor 13.

When the further rising temperature of the electrolyte in the cells reaches a predetermined valued in the upper half of the optimum temperature range, then temperature sensor 11 switches valve 9 in such a manner that the cooling medium flows through cooler 6 and is there cooled down. The cooler is so arranged that the air flow produced by forward movement of the vehicle flows through the cooler.

If the heat dissipation by means of the cooler is insufficient and the temperature of the electrolyte rises further, then, upon exceeding of the upper limit of the optimum temperature range, the temperature sensor 12 turns on blower 8. This considerably increases the heat dissipation from the cooling medium via cooler 6 to the ambient air.

The cooling system is so designed that the permissible maximum value of cell temperature is not exceeded, even at extreme loads in driving and charging and at extremely high ambient air temperatures.

Upon decline in temperature of the battery during use of the cells, the blower 8 is first disconnected, upon further decrease in temperature the valve 9 is then switched over to cause the cooling medium to flow through bypass conduit 10. When a warm battery is taken out of service, the previously mentioned switch (not shown) disables the entire cooling system and the battery then cools off slowly solely through its outer surfaces. On the other hand, if the cooling system remains operative, then the battery continues to be cooled until it reaches its lower predetermined temperature value. This is sensed by temperature sensor 18 and circulating pump 7 is then the final component of the cooling system to be turned off.

During propulsion service, i.e., when the battery is being discharged, the energy for driving the pump 7 and blower 8 must be delivered by the battery. To conserve this energy, the circulatory cooling system is so controlled that during battery discharge either the entire cooling system or at least portions thereof, preferably blower 8, is disconnected. The heat which is not removed during propulsion service is then stored in the battery and is dissipated on a suitable occasion, such as during charging when the energy for operating the blower is supplied by the charging equipment, through turning on of blower 8. Control of the switching of blower 8 and, if necessary, of pump 7, can be accomplished in that case in known manner, e.g., in response to the potential level or the current direction.

Another way to save energy during discharge of the battery involves controlling the motor of blower 8 in such a manner that it rotates more rapidly with increasing potential. This causes the battery to be cooled intensively during charging due to the higher potential supplied to blower 8. During discharging of the battery it is cooled less because of the lower blower speed attributable to the lower potential. However, energy is simultaneously conserved because the motor then requires less current due to its current voltage characteristics.

The cooling system shown in FIG. 5 further affords the possibility of internal cooling. For that purpose, connector plugs 19 of manifold 5 are connected in known manner to an external cooling system or, in the simplest case, to a water pipe supply. By introducing into the circulatory cooling system a cooling medium (water) at low temperature, intensive cooling of the battery is accomplished. This type of external cooling is particularly suitable when the battery is in exchange service and is, from time to time, in a battery exchange station where it is being charged for its next service period. Coupling of the battery circulatory system through plugs 19 to an external circulatory cooling system can then be accomplished automatically during battery exchange.

It has frequently been attempted to utilize, for heating purposes, the heat developed in the cells of a battery during operation. This would be particularly useful for battery powered vehicles, because it would then not be necessary to draw the heating energy for the interior of the vehicle from the propulsion battery in the form of electrical energy, nor would it be necessary to provide heating systems using different power sources. However, such attempts have heretofore not met with success.

In a system in which the heat developed in a battery is to be used for space heating, the cooling medium of the battery should simultaneously serve as the heating medium for the space. In batteries of conventional type and construction the permissible upper temperature limit for continuous use is about 50° C, which is a comparatively low temperature for space heating. Since the cooling medium of the battery is at an even lower temperature, it is not suitable as the space heating medium because the temperature difference between heating medium and the air in the space to be heated is too small to provide sufficient heat transfer in conventional heat exchangers.

A different situation prevails in the embodiment of FIG. 6, to which reference may now be made. There, it is practical to utilize the heat developed in the battery for space heating. This is accomplished by utilizing temperature transformation to raise the temperature of the cooling medium in the region of cooler 6 to a higher temperature level. Such a temperature transformation takes place in known manner by means of a compressor connected ahead of cooler 6 and by an expansion element connected behind cooler 6 into the circulatory cooling system of the battery.

As shown in FIG. 6, a compressor 21 is connected in the inlet 20 between cooler 6 and the junction point of bypass conduit 10 and manifold 5. An expansion element 23 is connected between valve 9 and cooler 6 in the outlet 22 of cooler 6. The combination of compressor 21 and expansion element 23 is sometimes referred to as a "heat pump". In this arrangement, pump 7 is preferably placed in bypass conduit 10 so that, when the compressor is turned off and no heat exchange takes place through cooler 6, the cooling circulation through all the cooling elements 3 of cells 2 and through bypass conduit 10 can be maintained by pump 7 in order to equalize the cell temperatures.

By using conventional media in the circulatory cooling system, a single stage compressor is capable of producing a temperature rise of about 20°–30° C. Given a battery temperature of 50° C, the cooling medium in the cooling coils 3 of cells 2 may have a temperature of about 40° C. By compression in compressor 21 the temperature of this medium is transformed upwardly to about 60°–70° C. At that temperature, an intensive heat exchange through cooler 6 is possible and this in turn provides heating of the cooling air to such a temperature level that this cooling air becomes suitable for space heating.

In still another embodiment, complete temperature control of the propulsion battery and the passenger compartment of the driven vehicle becomes possible. In this embodiment, the heat developed in the battery is either dissipated to the outside air through a cooler or, after having been raised to a higher temperature level by a compressor, it is dissipated through a heat exchanger to heat the passenger compartment.

The circulatory system further includes a heat buffer storage which is charged during higher heat development and whose stored heat can be drawn upon as needed to heat the passenger compartment. Should the heat losses in the battery not be sufficient to meet the heating requirements of the passenger compartment at low outside temperatures, then a supplemental heater can be used to charge the heat storage from an external power source. This supplemental heater can also provide the energy for raising to its optimum operating temperature range the battery which has been cooled by such low outside temperatures at the start of operation.

This embodiment also makes it possible to utilize the same components for providing cooling of the battery and cooling of the passenger compartment at high outside temperatures. In that case, the heat is rejected to the outside air through a heat exchanger.

In those cases in which the heat losses of the battery are used for heating, it is desirable to thermally insulate the battery itself with respect to the outer air. This makes is possible to use all the heat for heating purposes.

Electric buses used in scheduled traffic require for their economic and routine utilization a propulsion battery with an energy capacity of about 150 kwh. This provides an operating period of about 4 hours in city traffic. At the end of this period, the battery is automatically exchanged and recharged in a charging station. The watt-hour efficiency of a propulsion battery in such usage is about 0.75. Therefore, the battery must be charged with about 200 kwh to allow drawing about 150 kwh from it. The difference of 50 kwh is dissipated in the form of energy loss in the battery during charging and discharging and is stored in the form of heat. If the battery is thermally insulated, then about 80% of the stored heat, i.e., 40 kwh, is available for heating purposes. Given a usage period of 4 hours, this corresponds to a heating performance of 10 kw or 8600 kcal per hour. This heating performance is sufficient to adequately heat the passenger compartment of standard model buses, even during the major portion of the annual cold season.

Figure 7:
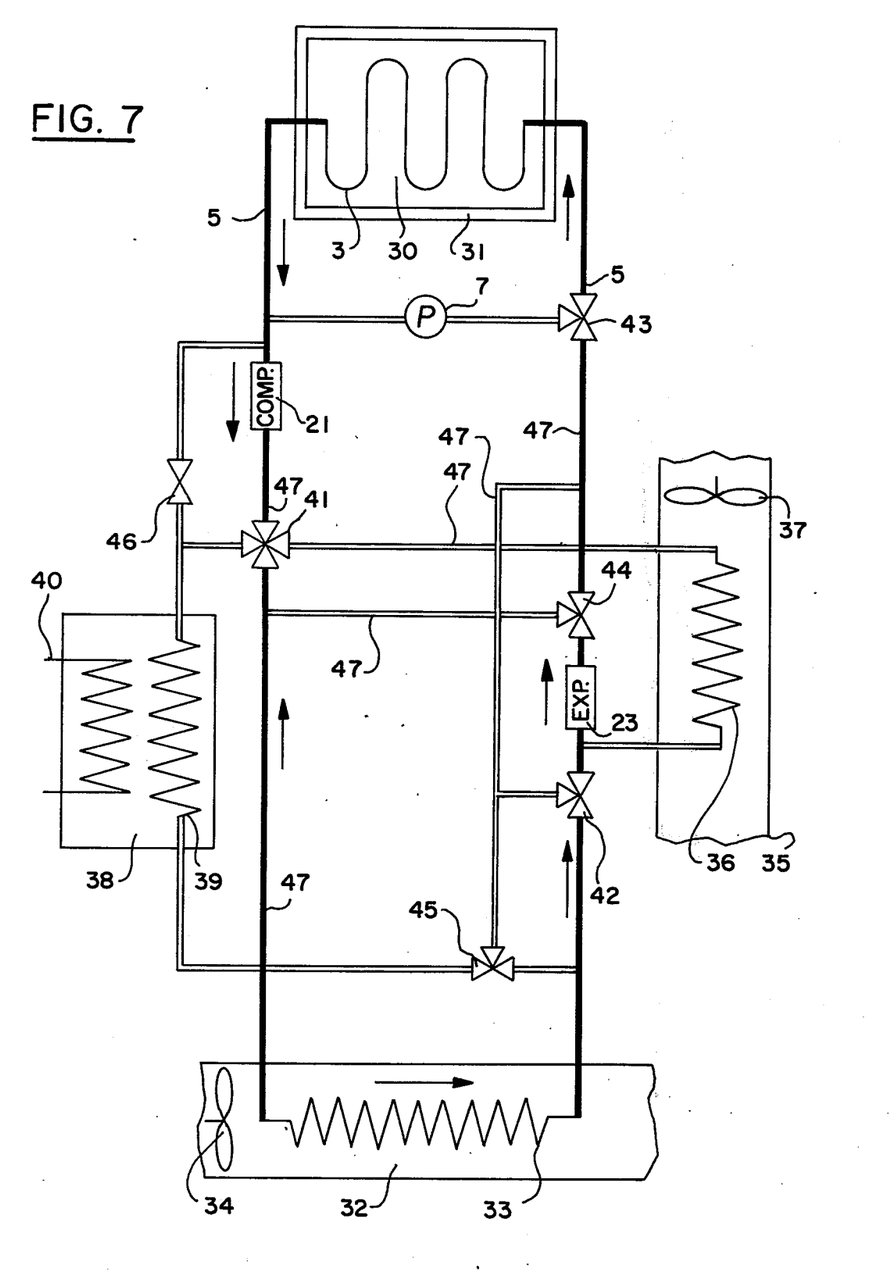
FIGS. 7 through 12 show various specific embodiments of the overall cooling circulatory system for such battery assemblies.

FIG. 7 shows a temperature conditioning system, embodying the foregoing principles.

Before proceeding, it is desired to point out that FIGS. 7 through 11 all show the identical systems components, connected together in the identical manner. However, these different figures show different circulatory paths for the cooling medium, corresponding to different operational requirements. In each figure the pipes forming the path actually being used are indicated by heavy lines, while the light lines indicate pipes remaining unused in that particular path configuration.

Reverting to FIG. 7, the battery 30 has a thermal jacket 31 which insulates it from the ambient air. This makes is possible to confine the heat transfer from the battery to the heat transport medium circulating in cooling coils 3 of the cells.

There is also a space heater system 32 with heat exchanger 33 and blower 34.

A second heat exchanger system 35, with heat exchanger 36 and blower 37, is mounted outside the vehicle where it can be traversed by the vehicle movement air flow.

There is a heat storage system 38, with heat exchanger 39 and electric heating element 40 which can be supplied from an external, stationary power source (not shown). A compressor 21 is provided, and so is an expansion element 23.

Valves 41 to 46 can be so switched that, in conjunction with the system composed of pipes 47, predetermined functions are carried out by this temperature conditioning system. Control of the system takes place by means of a plurality of temperature sensors (not shown) located within the cells of battery 30, the heat storage system 38 and the passenger compartment which is to be heated and which contains heater system 32.

The following modes of operation can be carried out by means of this temperature conditioning system.

The battery can be cooled, while the passenger compartment is heated by the heat removed from the battery. This is the adjustment shown in FIG. 7. To that end, the valves are so adjusted that the heat transport medium flows at relatively low temperature through the cooling elements 3 and cells 2 of battery 30, thereby removing the heat developed in the battery. In compressor 21 this heat transport medium is brought to a higher pressure and therefore assumes a higher temperature. Through valve 41 it reaches space heater system 32. There, blower 34 passes air over heat exchanger 33, thereby removing heat from the heat transport medium and utilizing same to heat the compartment.

Through valve 42, the heat transport medium flows into expansion element 23, in which the heat transport medium whose temperature has already been reduced in heat exchanger 33 is brought to a still lower temperature through expansion.

Through valves 43 and 44, the heat transport medium then flows into cooling elements 3 in which it is again heated by the higher temperature of the electrolyte in cells 2. This completes the circulation.

Figure 8:
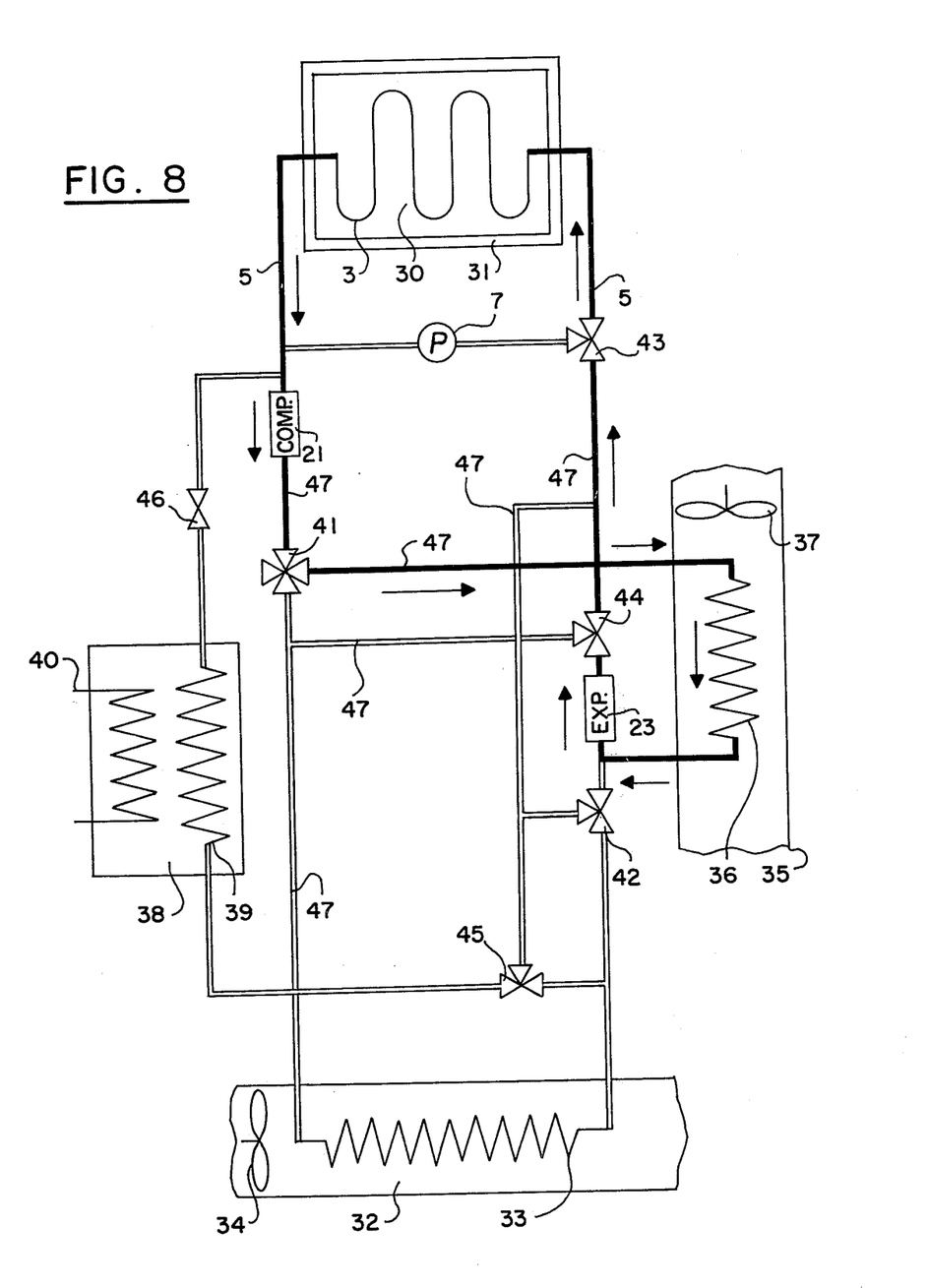

Another mode of operation of this system involves cooling of the battery accompanied by heating rejection to the ambient air. This condition is shown in FIG. 8. As in the case of FIG. 7, the pipes shown in heavy lines are those which are traversed by the cooling medium in the adjustment of the system. In this case, the piping system is so connected that the heat transport medium first flows through the cooling elements 3 of battery 30, then through compressor 21 in which its temperature is raised, then through valve 41, through heat exchanger 36 of cooling system 35 with heat rejection to the ambient air, then through expansion element 23 with cooling through expansion and finally through valves 44 and 43 back into the cooling elements 3 of battery 30. In these, heat removal from the electrolyte of the battery again takes place.

Figure 9:
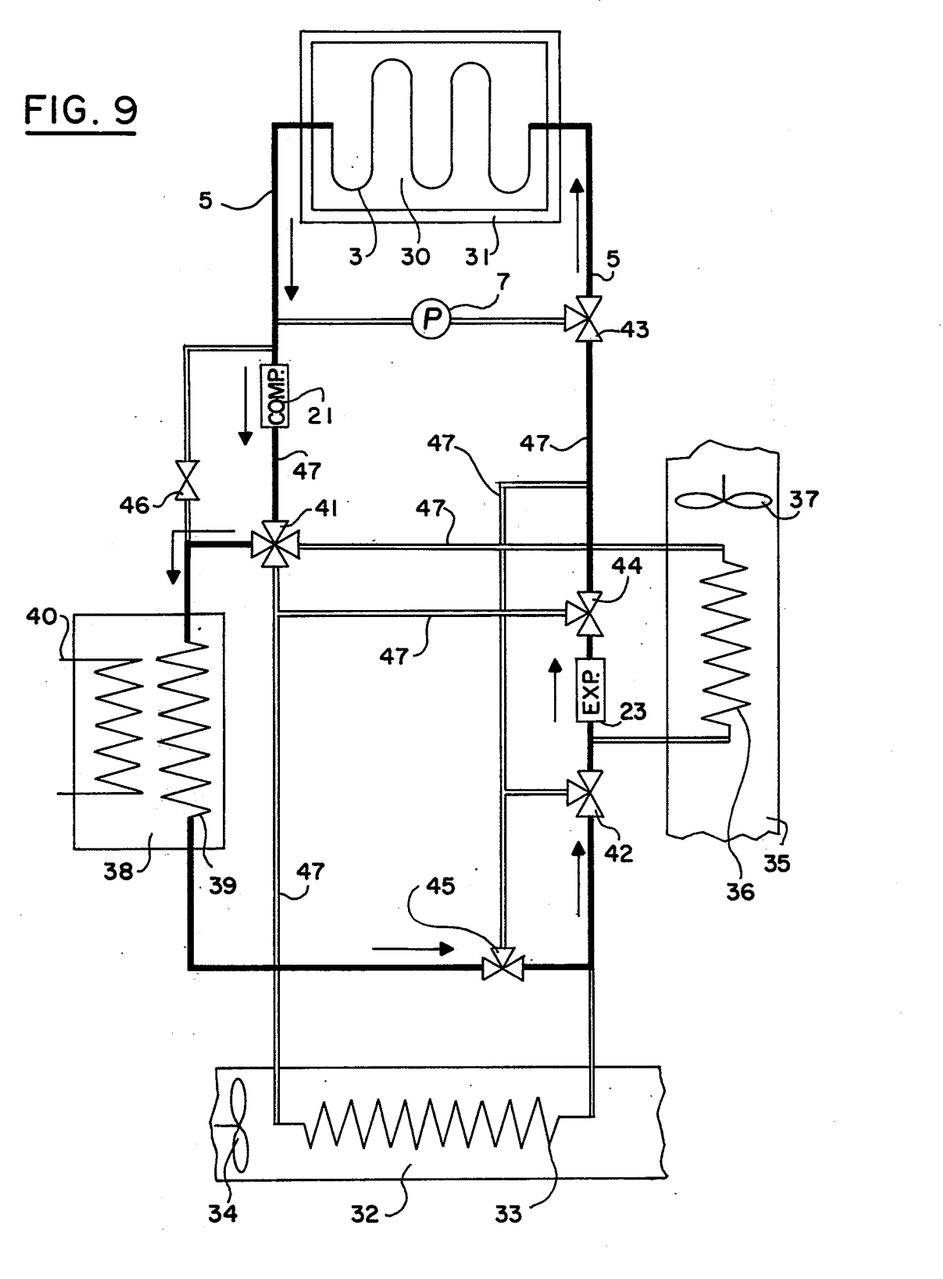

Still another mode of operation for this system involves cooling of the battery with storage of the removed heat in the heat storage system. This situation is shown in FIG. 9. The flow of the heat transport medium in this situation is as follows.

Cooling element 3 of battery 30, compressor 21 with temperature increase, valve 41, heat exchange 39 with heat transfer to storage system 38, valves 45 and 42, expansion element 23 with temperature reduction through expansion, then through valves 44 and 43 back to cooling elements 3 of battery 30. There heat removal from the battery recurs.

Figure 10:
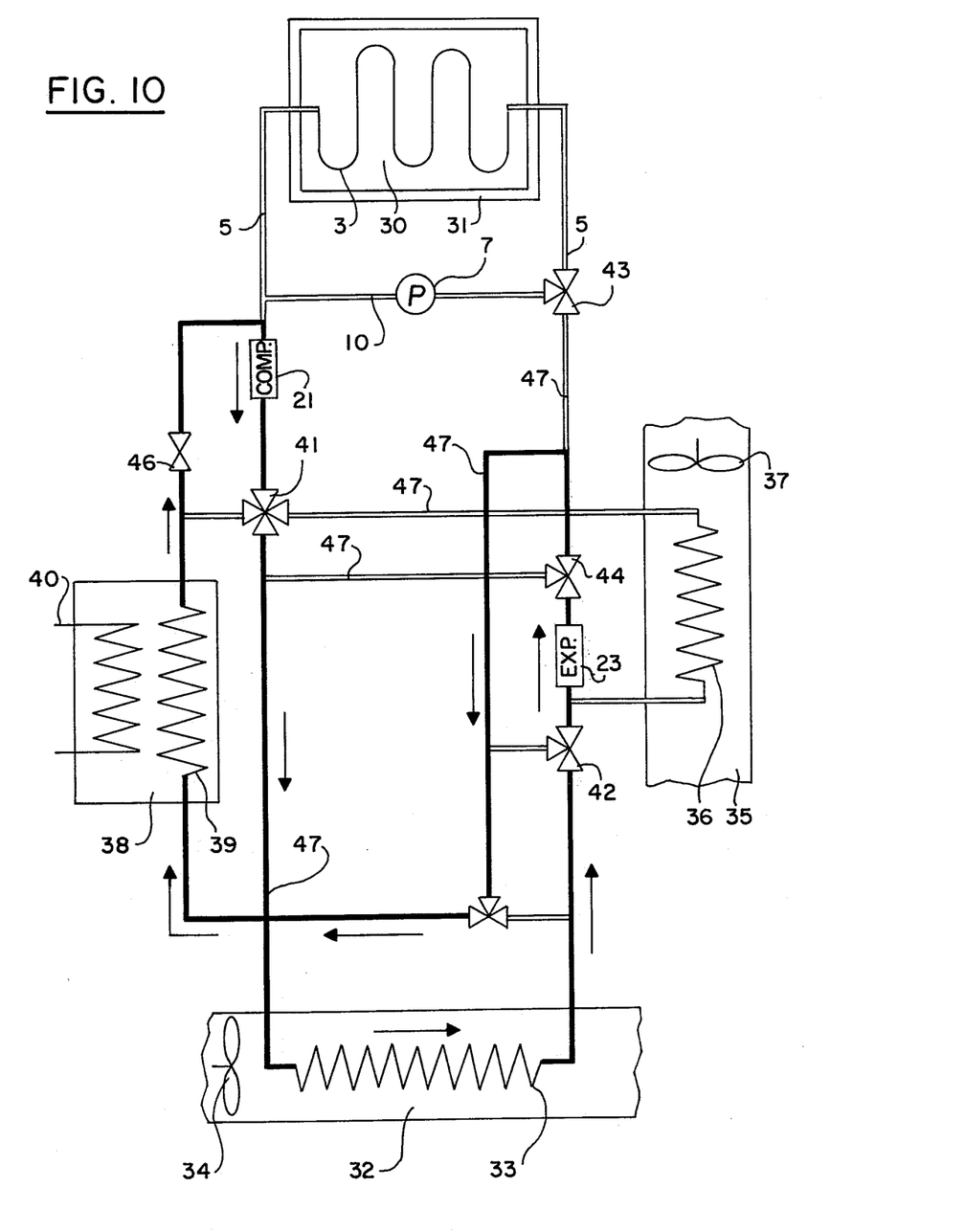

Still another method of operation is shown in FIG. 10. This involves utilizing the heat stored in storage system 38 for heating the passenger compartment. This method proceeds as follows.

The heat transport medium has absorbed heat in the heat exchanger 39 of storage system 38. It then flows through valve 46 into compressor 21. There the temperature of the medium is raised. Through valve 41 the medium is supplied to heat exchanger 33. There its heat is rejected into the passenger compartment which is heated thereby. Through valve 42 the medium flows into expansion element 23 with accompanying temperature reduction. Then the medium flows through valves 44 and 45 back into the heat exchanger 39 of heat storage system 38 in which it again absorbs heat.

Figure 11:
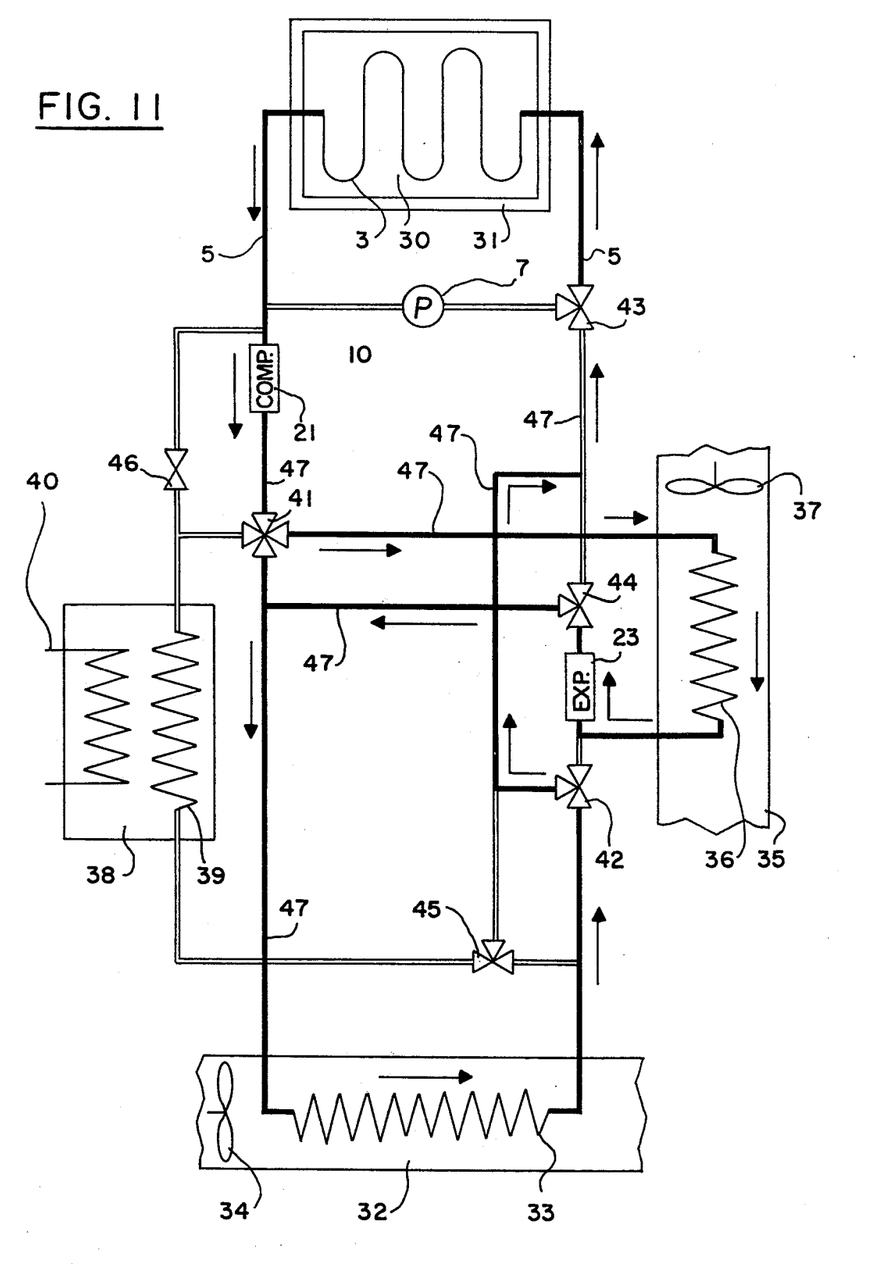

Finally, provision can be made to cool both the battery and the passenger compartment. This mode of operation, in which the heat is rejected to the ambient air, is shown in FIG. 11. In this situation, the heat transport medium is brought to a low temperature in expansion element 23. Through valve 44 it reaches heat exchanger 33 and removes heat from the air of the passenger compartment, thereby cooling that compartment. The heat transport medium is only slightly heated in the process. Through valves 42 and 43 the transport medium then flows into the cooling element 3 of battery 30 where it is heated further and thereby also cools the battery. In compressor 21 a further temperature increase of the transport medium is produced through compression. It then reaches heat exchanger 36 through valve 41. There the heat is rejected through cooling by means of the air flow produced by vehicle movement and blower 37. The circuit is closed when the heat exchange medium again reaches expansion element 23.

In addition to the foregoing methods of operation, still other functions can be performed by appropriate connection of the individual elements. Thus, it is possible to cool only the passenger compartment. To this end, the arrangement of FIG. 11 is so switched that the heat transport medium is ducted past battery 30 through valve 43, pump 7 and bypass conduit 10.

It is also possible to only equalize the temperature in the individual cells of the battery. To that end, the heat transport medium is introduced by means of pump 7 through bypass 10 and valve 43 into the cooling elements 3 of cells 2 of battery 30. All other components of the system are disconnected during this mode of operation.

The various functions which can be performed by means of this temperature control system are automatically set up, utilizing control signals from the temperature sensors in the battery, in the storage element and in the passenger compartment. This assures that the battery works within its optimal temperature range for all possible ambient temperatures, and that a satisfactory temperature prevails simultaneously in the passenger compartment.

In all of the embodiments of FIGS. 7 through 11, the motor and control arrangements of the system are all electrically connected to the battery and supplied with power from it. The power consumption of these elements is low so that it does not represent a significant additional drain on the battery.

In a further embodiment of this temperature control system, the heat transport medium circulatory system is subdivided into two separate, circulatory subsystems. These are coupled to each other for heat transfer through a heat exchanger. The components of one circulatory subsystem are preferably connected to the battery, while the components of the other are preferably within or mounted on the vehicle. The heat exchanger which couples the two subsystems to each other for heat transfer is also mounted on the vehicle. At the point at which the piping of the battery subsystem connects to the heat exchanger mounted on the vehicle, the subsystem can be disconnected by plug-in elements. This makes it possible to remove the battery, together with thoe elements of its circulatory subsystem which are attached to it, from the vehicle in just a few minutes. This arrangement makes it possible to use the battery in so-called exchange service, in which the discharged battery is automatically removed from the vehicle and replaced and is recharged in a so-called exchange and charging station.

This embodiment of the temperature conditioning system may use water as the heat transport medium in the battery circulatory subsystem. On the other hand, the circulatory subsystem which is mounted on the vehicle preferably uses a heat transport medium which is particularly suitable for compression and expansion. For this, commercial cooling media may be used, of the type used in cold storage and air conditioning systems (such as halogenated hydrocarbons). This embodiment has the advantage that, as previously explained, the battery can be intensively cooled in a simple manner by connecting its circulatory subsystem to an external water cooling system while it is in the exchange and charging station.

Figure 12:
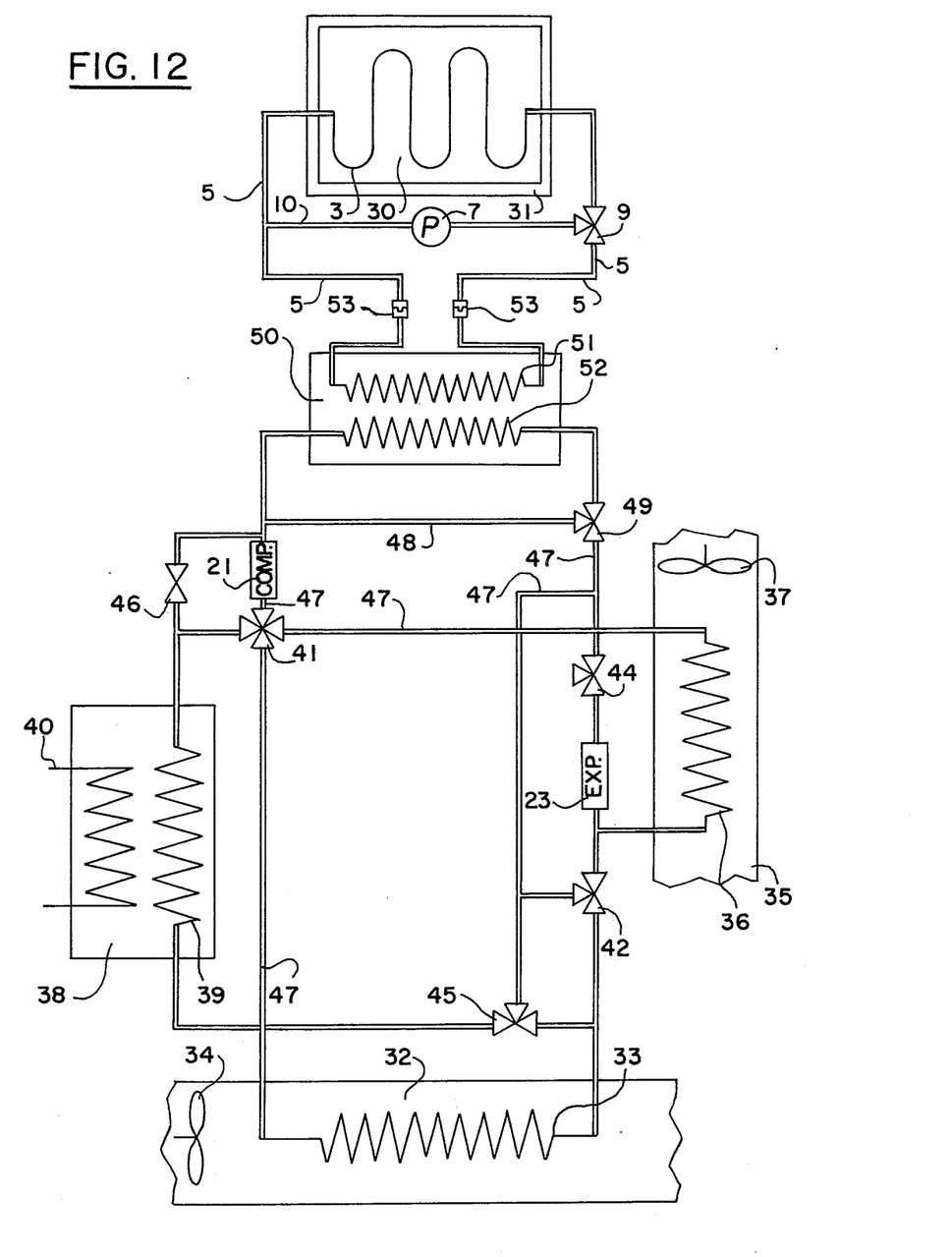

FIG. 12 shows the principles of construction of this embodiment. The heat transport medium circulatory subsystem of the battery includes cooling elements 3 within the cells of battery 30, pipes 5, valve 9, pump 7 and bypass conduit 10. Also forming part of this circulatory subsystem are heat exchanger element 51 of heat exchanger 50 and plug-in connectors 53. On the other hand, the heat transport medium circulatory subsystem of the vehicle includes heat exchanger element 52 of heat exchanger 50, piping system 47 with bypass 48, valve 49, compressor 21, expansion valve 23 and heat exchangers 32 and 35 as well as storage system 38 and the valves associated therewith.

Heat exchanger 50 with the heat exchanger element 51 forming part of the battery circulatory subsystem is mounted on the vehicle. The other components forming part of the battery circulatory subsystem are, as previously described, attached to the battery in movable fashion and with compact construction.

Plug-in connectors 53 consist of individual connectors so constructed as to provide open passages when connected together. When they are disconnected, they automatically close off the separated pipe ends so that the cooling medium cannot escape.

We claim:
1. A system for dissipating the heat developed in the cells of a multicell storage battery, comprising:
cooling elements immersed in the electrolyte in the tops of said battery cells;
said cooling elements being formed of material having high heat conductivity and electric resistance, and said medium having low electric resistance, whereby said cooling medium is caused to circulate through said elements is substantially potential-free manner, and
said cooling elements being connected between manifolds in groupings:
means for causing a cooling medium to circulate through said cooling elements, said circulation of cooling medium being produced by a pump causing passage of said medium via said manifolds through said elements;
heat exchanger means connected between said manifolds and equipped with a blower for forced air cooling;
a bypass conduit for said heat exchanger also connected between said manifolds;
a two-way valve for causing said medium to flow alternatively through said heat exchanger means and said bypass conduit;

heat sensing means located in individual cells for separately controlling saidpump, said two-way valve and said forced air cooling blower; and compressor means connected to one side, and expansion means connected to the other side of said heat exchanger means, said pump being positioned in said bypass conduit.

2. The system of claim 1 further comprising heating means for said bypass conduit, and switching means for selectively actuating said heating means.

3. The system of claim 1, further comprising second heat exchanger means, and heat storage means, each connected in parallel across said pump-containing bypass conduit.

4. The system of claim 3, wherein said firstmentioned exchanger means is located in the passenger compartment of a vehicle propelled by said battery, said second heat exchanger is mounted on the outside of said vehicle, and said heat storage means is mounted on the vehicle.

5. The system of claim 3, wherein said storage means is provided with heating means independent of said cooling medium.

6. The system of claim 3 further divided into two circulating subsystems coupled together for heat transfer by heat exchanger means.

7. The system of claim 6, wherein the components of one said subsystem are mounted on the battery and the components of the other subsystem are mounted on a vehicle to be propelled by the battery.

8. The system of claim 7, wherein the subsystem mounted on the battery is provided with plug-in connectors for coupling to external cooling medium supply means.

9. The system of claim 8, wherein said subsystem mounted on the battery is separable from the subsystem mounted on the vehicle by means of said connectors.

10. The system of claim 9, wherein said connectors are self-sealing upon separation.

11. The system of claim, 1, wherein said battery is thermally insulated from the ambient. j 12. The system of claim 5, comprising valve and conduit means for producing various configurations of cooling medium flow paths through said system.

13. The system of claim 7, comprising valve and conduit means for producing various configurations of cooling medium flow paths through said system.

14. A system for dissipating the heat developed in the cells of a multicell storage battery, comprising:

cooling elements immersed in the electrolyte in the tops of said battery cells;

said cooling elements being formed of material having high heat conductivity and electric resistance, and said medium having low electric resistance, whereby said cooling medium is caused to circulate through said elements in substantially potential-free manner, and said cooling elements being connected between manifolds in groupings;

means for causing a cooling medium to circulate through said cooling elements, said circulation of cooling medium being produced by a pump causing passage of said medium via said manifolds through said elements;

heat exchanger means connected between said manifolds and equipped with a blower for forced air cooling;

heat sensing means located in individual cells for separately controlling said pump and said forced air cooling blower; and compressor means connected to one side, and expansion means connected to the other side of said heat exhanger means.

15. The system of claim 14, wherein the elements are connected in series groupings.

16. The system of claim 14, wherein the elements are connected in parallel groupings.

17. The system of claim 14, wherein the elements are connected in series-parallel groupings.

* * * * *